Dec. 26, 1939.   F. R. EDDY   2,185,076
APPARATUS FOR WINDING SCRAP FROM MULTIPLE SLITTING SHEARS
Filed March 21, 1939   2 Sheets-Sheet 1
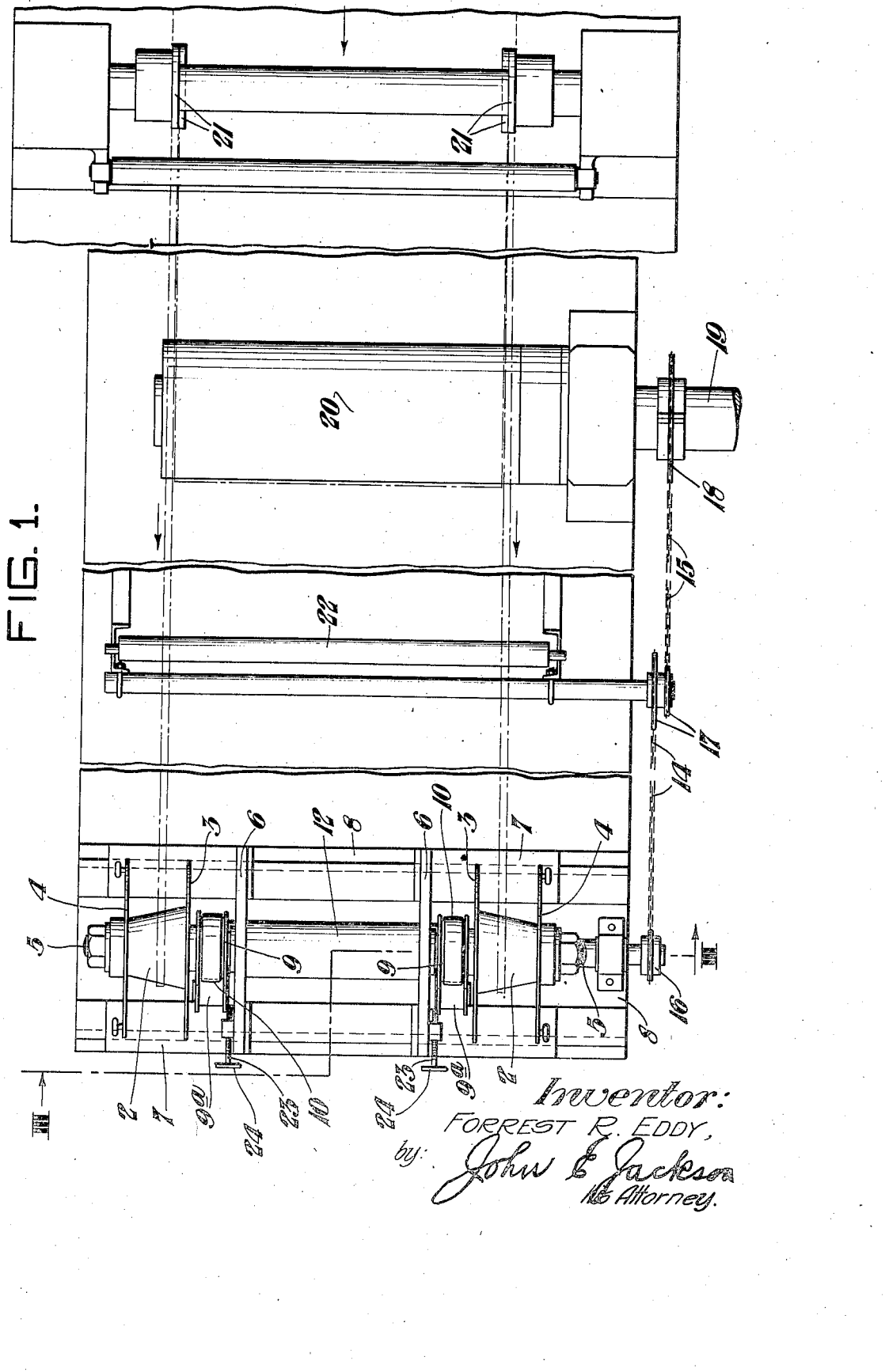
Inventor:
FORREST R. EDDY,
by John E. Jackson
His Attorney.

Dec. 26, 1939.　　　　F. R. EDDY　　　　2,185,076
APPARATUS FOR WINDING SCRAP FROM MULTIPLE SLITTING SHEARS
Filed March 21, 1939　　　2 Sheets-Sheet 2
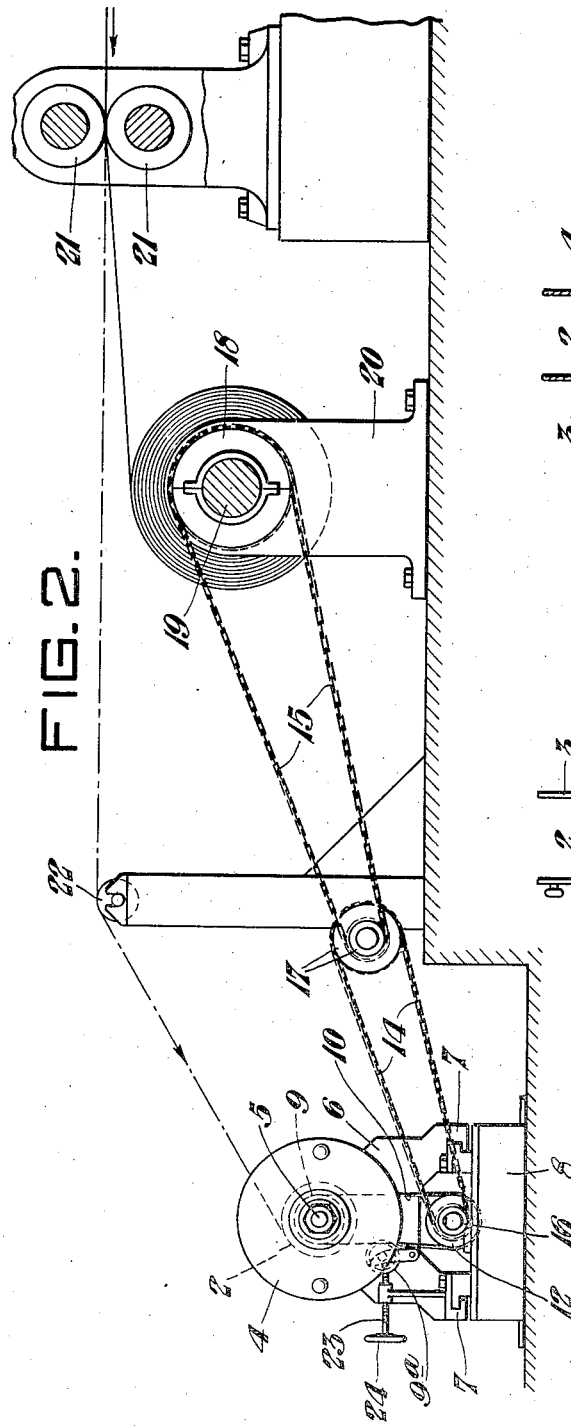
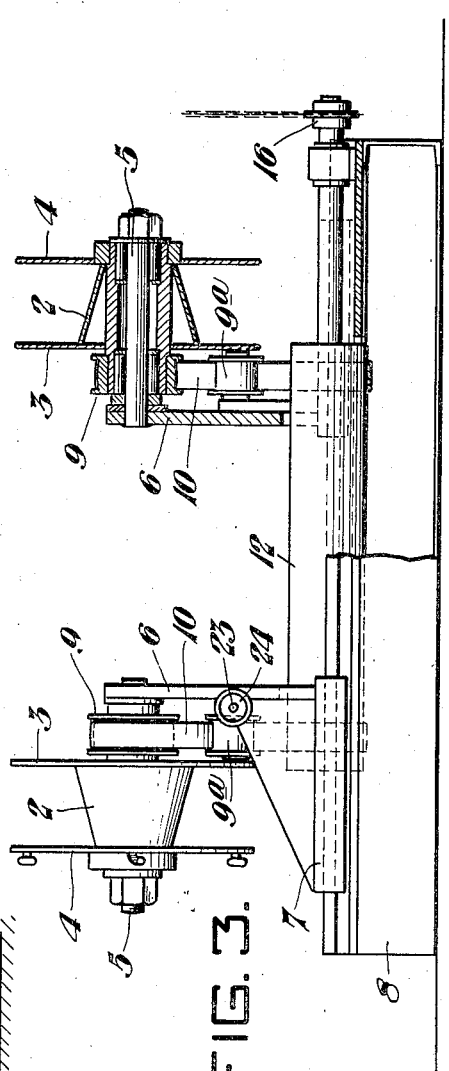
Inventor:
FORREST R. EDDY,
by John E. Jackson
his Attorney.

Patented Dec. 26, 1939

2,185,076

UNITED STATES PATENT OFFICE 2,185,076

APPARATUS FOR WINDING SCRAP FROM MULTIPLE SLITTING SHEARS

Forrest R. Eddy, Gary, Ind.

Application March 21, 1939, Serial No. 263,281

2 Claims. (Cl. 164—65)

The present invention relates to an apparatus for winding scrap from multiple slitting shears.

An object of the present invention is to provide a winding apparatus in combination with multiple slitting shears so that the elongated scrap edge material can be advantageously wound upon reels operated in synchronism with the feed of the material to the slitting shears.

Other objects and advantages will become apparent as the description proceeds and reference is had to the accompanying drawings in which:

Figure 1 is a plan view of the present invention in combination with the side slitting shear mechanism;

Figure 2 is a side elevation of Figure 1, diagrammatically showing the elongated scrap material being fed to the winding apparatus; and, Figure 3 is a section on line III—III of Figure 1.

In the drawings, the apparatus for winding the scrap coming from the slitting shears comprises two tapered spools 2 spaced the required distance apart so that they may receive the elongated scrap material coming from the slitting shears. The spools are identical in construction and therefore, only one need be specifically described. Each spool includes an inside flange 3 and an outer detachable flange 4. The spool is mounted on a stub shaft 5, carried by a bracket 6 secured, in any conventional manner, to slides 7 movable on a base 8. Secured in any conventional manner to spool 2 between the bracket 6 and the inner flange 3 of said spool is a pulley wheel 9 over which is adapted to move a pulley belt 10. The belt 10 is motivated by a belt roller 12 which extends between the two spaced spools 2 so that they may be driven in synchronism. The belt roller is driven through roller chains 14 and 15 and sprockets 16, 17 and 18 from power derived from the main shaft 19 of a strip recoiler 20.

As shown in Figure 1, the numeral 21 represents the slitting shears, 20 represents the recoiler for the trimmed strip material, while 22 represents a billy or idler roll over which the scrap material passes to the winding spools 2.

When it is desired to wind the elongated scrap edges coming from the multiple slitting shear, the end of the scrap material is passed over the idler or billy roll 22 and inserted in a suitable slot or other holding instrumentality on the flanges 4 of the spools 2. Upon rotation of the recoiler shaft 19 for recoiling the material which has been trimmed, the belt roller 12 is driven by the roller chains 14 and 15 and sprockets 16, 17 and 18 so as to cause rotation of the pulley belts 10 for rotating, in synchronism, each of the tapered spools 2. The ratio of the belt roller drive sprockets 16, 17 and 18 is fixed so that the surface speed of the belt roller 12 will always be greater than that of the pulleys on the shafts 5, regardless of the varying ratio of the strip speed to rotation of the recoiler 20 due to build-up of coils thereon.

This may cause constant slipping of the belts on the belt roller 12, and to compensate for such slippage, tension on the scrap may be regulated by adjusting the tension on said belts by means of an idler pulley 9ª, which is adjusted by means of the screw 23 operated by hand-wheel 24. When the operation of side trimming is completed on one coil, the outer flange 4 of each of the tapered spools 2 is removed by rotating it on its spool about ten degrees and pulling it outward, as in the manner of bayonet-and-slot devices. This permits the coil of scrap to be removed and loaded on a truck.

While I have shown and described a specific embodiment of the present invention, it will be seen that I do not wish to be limited exactly thereto, since various modifications may be made without departing from the scope of the invention, as defined by the following claims.

I claim:

1. A scrap winder for coiling the narrow elongated material coming from a multiple slitting shear comprising a base, a slide mounted on said base, brackets carried by said slide, a stub shaft secured to each of said brackets, a reel on each stub shaft, a pulley mounted on each stub shaft, a shaft supported on said base, a roller on said shaft, a belt connecting each pulley with said roller, means for rotating said roller whereby said reels are rotated in synchronism for winding the elongated scrap material being fed thereto.

2. In combination with a multiple slitting shear and recoiler, a device for winding the narrow elongated scrap material coming from the slitting shear comprising a support, stub shafts carried by said support, reels on said shaft for receiving the elongated scrap material coming from said slitting shear, a belt roller on said support, driving connections between said belt roller and said stub shafts and means for rotating said belt roller whereby said reels coil the elongated scrap material fed from said slitting shear, said last mentioned means rotating said belt roller at a speed greater than the speed of rotation of said pulleys regardless of the varying ratio of strip speed to rotation of said recoiler due to build-up of the coil of material.

FORREST R. EDDY.